(12) United States Patent
Faiola et al.

(10) Patent No.: US 6,850,861 B1
(45) Date of Patent: Feb. 1, 2005

(54) SYSTEM FOR MONITORING SENSING DEVICE DATA SUCH AS FOOD SENSING DEVICE DATA

(75) Inventors: Norm Faiola, Ithaca, NY (US); Robert S. Wood, Jr., Syracuse, NY (US); Joel Morrissette, Fairfield, ME (US)

(73) Assignee: Syracuse University, Syracuse, NY (US)

( * ) Notice: Subject to any disclaimer, the term of this patent is extended or adjusted under 35 U.S.C. 154(b) by 0 days.

(21) Appl. No.: 09/316,651

(22) Filed: May 21, 1999

(51) Int. Cl.[7] .......................... G01K 11/00; G01K 17/00
(52) U.S. Cl. ........................................... 702/130
(58) Field of Search .......................... 702/130, 136, 702/173, 178, 182, 187–189; 374/100, 141, 170; 219/620, 621

(56) References Cited

U.S. PATENT DOCUMENTS

| | | | |
|---|---|---|---|
| 1,727,187 A | 9/1929 | Weinrich | 62/530 |
| 1,923,522 A | 8/1933 | Whitehouse | 62/530 |
| 2,129,572 A | 9/1938 | Finnegan | 165/138 |
| 2,203,591 A | 6/1940 | Brown | 62/530 |
| 2,805,554 A | 9/1957 | Schachtsiek | 62/7 |
| 4,028,688 A | 6/1977 | Goleman | 340/539 |
| 4,237,731 A | * 12/1980 | Dehn | 374/155 |
| 4,325,230 A | 4/1982 | Driscoll et al. | 62/293 |
| 4,554,189 A | 11/1985 | Marshall | 428/11 |
| 4,656,840 A | 4/1987 | Loofbourrow et al. | 62/530 |
| 4,735,063 A | 4/1988 | Brown | 62/293 |
| 4,761,314 A | 8/1988 | Marshall | 428/11 |
| 4,882,564 A | 11/1989 | Monroe et al. | 340/449 |
| 4,884,626 A | * 12/1989 | Filipowski | 165/231 |
| 4,936,377 A | 6/1990 | DeVogel et al. | 165/47 |
| 5,044,914 A | * 9/1991 | Schulling | 425/169 |
| 5,262,758 A | 11/1993 | Nam et al. | 340/588 |
| 5,360,965 A | * 11/1994 | Ishii et al. | 219/705 |
| 5,424,720 A | 6/1995 | Kirkpatrick | 340/585 |
| 5,460,006 A | 10/1995 | Torimitsu | 62/127 |
| 5,575,563 A | * 11/1996 | Chiu et al. | 374/141 |
| 5,655,305 A | 8/1997 | Fletcher | 374/170 |
| 5,682,142 A | 10/1997 | Loosmore et al. | 340/572.1 |
| 5,684,463 A | 11/1997 | Diercks et al. | 340/584 |
| 5,689,442 A | * 11/1997 | Swanson et al. | 380/241 |
| 5,703,575 A | 12/1997 | Kirkpatrick | 340/870.17 |
| 6,137,095 A | * 10/2000 | Kashimoto et al. | 219/702 |

FOREIGN PATENT DOCUMENTS

JP 4-347417 * 12/1992

OTHER PUBLICATIONS

Sell Sheet, Cooper Thermocouple, Model HT3100 (2 Pgs.), believed to be published prior to May 21, 1999.

* cited by examiner

Primary Examiner—Michael Nghiem
(74) Attorney, Agent, or Firm—Wall Marjama & Bilinski LLP

(57) ABSTRACT

A monitoring system particularly useful for monitoring food located at one or a plurality of food serving or storage location includes a sensing subsystem and a processing subsystem. The sensing subsystem may include at least one sensing device and the processing subsystem may include a personal computer. The processing subsystem may be adapted to encrypt received data to the end that data stored in memory is substantially impervious to data tampering.

129 Claims, 6 Drawing Sheets

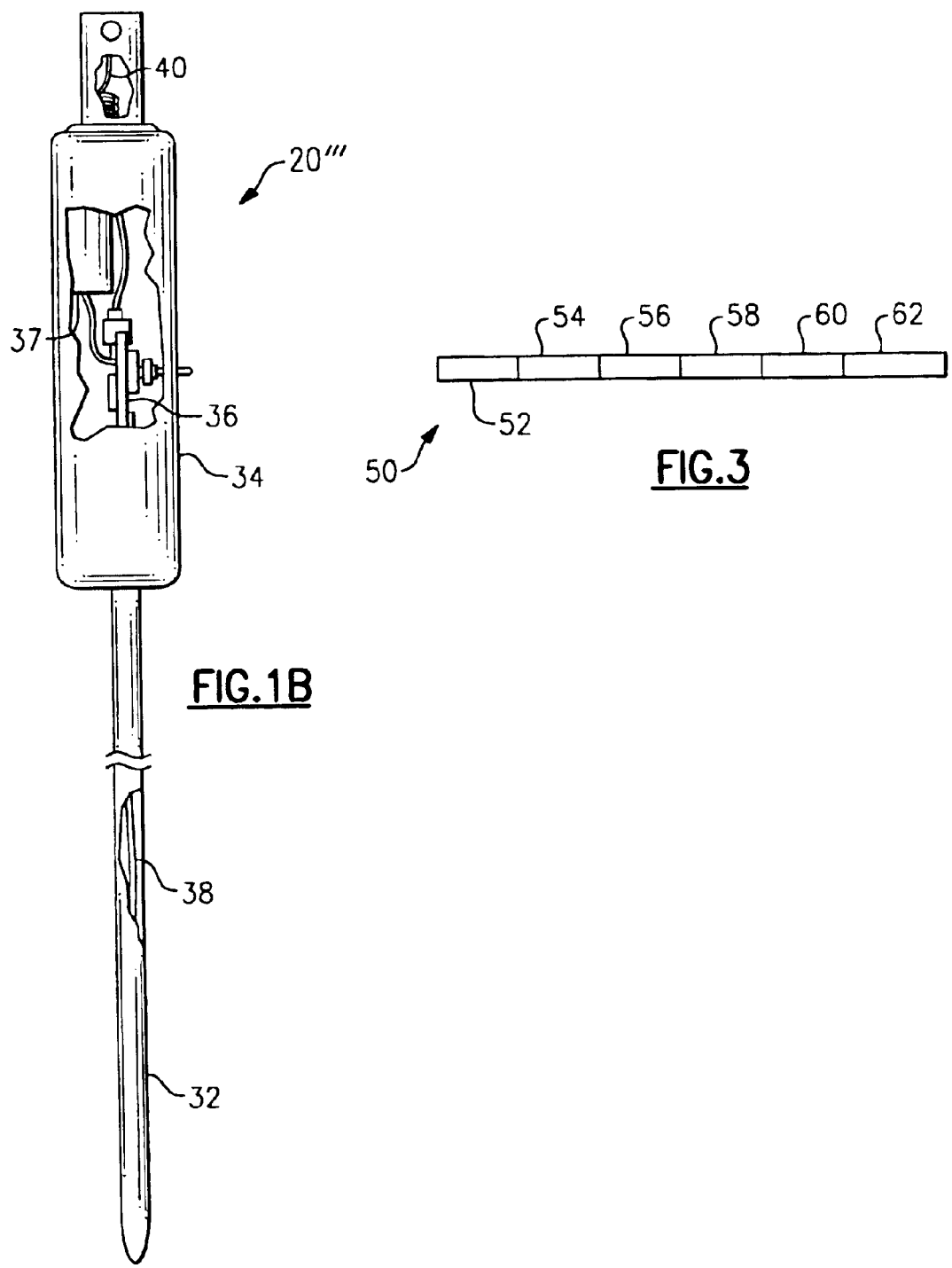

SYSTEM FOR MONITORING SENSING DEVICE DATA SUCH AS FOOD SENSING DEVICE DATA

FIELD OF THE INVENTION

The present invention relates to monitoring systems in general and in particular to a monitoring system for monitoring food located at food serving or storage locations.

BACKGROUND OF THE INVENTION

Buffet style restaurant facilities and cafeterias commonly contain food in temperature controlled serving containers. Some facilities contain several food service containers, each container being adapted to maintain a certain food product within a certain temperature range for several hours at a time. If food is not maintained within a predetermined temperature range then food can lose its flavor. More importantly, food spoilage can ensue if food which should be kept at cool temperatures becomes too warm or if food which should be kept at warmer temperatures becomes too cool.

Because of the number of injuries which could result from food spoilage, large scale food serving facilities expend a vast amount of resources in assuring that food temperature is maintained properly.

Many large scale food service facilities employ inspectors who record food temperature using a specially designed portable data collection device adapted to collect temperature data from served food. In use of such devices, an inspector places the device in contact with a served food product to record food temperature. One portable data collection device is used to collect data from each of several food product containers. Records over time for various serving or storage containers are kept manually, or, in more sophisticated devices are uploaded from a data collection device at intervals determined by the inspector, to a central processing facility.

Monitoring methods involving use of a portable data collection device are time consuming and require an excessive amount of human labor to be effective. Since these methods require human labor they are also susceptible to failure resulting from human error in the data collection process.

While human error and labor costs always limit the reliability and cost effectiveness of monitoring methods that require human labor, such as those methods involving use of a portable data collection devices, methods in which data is uploaded into computer storage devices are the susceptible to another type of problem. Food monitoring systems in which data is stored in host computers have been observed to be susceptible to tampering schemes which would allow an unscrupulous data collection worker to alter data recorded in a computer memory to cover up a system operations problem in the event an operations problem is observed.

There is a need for a food monitoring system which accurately monitors the temperature of stored or served food without requiring substantial human labor for effective operation, and which is substantially impervious to data tampering.

SUMMARY OF THE INVENTION

According to its major aspects and broadly stated the present invention is a food monitoring system for use by food service facilities which provides automatic monitoring and recording of data pertaining to food located at several food service or food storage locations. A data processing method associated with the method includes a provision that prevents unscrupulous tampering of stored data.

A monitoring system according to the invention includes a sensing subsystem and a processing subsystem. The sensing subsystem includes at least one sensing device and a transmitter while the processing subsystem normally includes a receiver and personal computer for recording and outputting sensed data. Sensing devices of the sensing subsystem may be in utensil form or in a simplified probe form.

A simplified probe structure for a sensing device comprises a rigid cylindrical housing and an elongated hollow pin section extending from the housing. In this simple structure a sensor can be completely disposed within a pin section enclosure to completely encapsulate the sensor. This simple structure provides the advantage of making the device easy to clean. Because simplified probe sensing devices do not have to be repeatedly removed from food, several probes can be hard-wired to a single multiprobe transmitter which transmits data from each of several probes to a receiver of the processing subsystem.

Signal processing circuits of the sensing devices receive sensor signals from at least one sensor and assemble digital data bitstreams for transmission to the processing subsystem. In addition to processing signals from at least one sensor, its the signal processing circuits of the sensing devices preferably generate bitstream data that encodes a device identifier encoding the identification of the device generating the data.

Data received by the processing subsystem is processed in accordance with instructions of a main program stored in a memory device. According to a typical processing routine, a processor compresses bitstream data, date and time stamps the data, and writes the bitstream data to a file of a memory device comprising an indexed hierarchical data storage structure adapted facilitate fast reading of data from memory.

To the end that data written to memory cannot readily be altered or otherwise corrupted, the processor subsystem preferably encrypts sensor bitstream data according to an encryption scheme when writing the data to memory. Use of an encryption scheme which cannot be determined without access to the main program's source code substantially prevents tampering of data stored in memory.

In a preferred embodiment, the processor is programmed with use of a sophisticated programming language facilitating graphical display of data which allows data to be observed in a variety of useful ways. The processor is preferably configured to survey all devices currently connected to the system, and to view sensor and battery data over time for any device which has been connected to the system, for any time period in which the system has been in use.

These and other details, advantages and benefits of the present invention will become apparent from the detailed description of the preferred embodiment herein below.

BRIEF DESCRIPTION OF THE DRAWINGS

In the drawings, wherein like numerals are used to indicate the same elements throughout the views.

FIG. 1B is a physical embodiment of probe sensing device which may be used in connection with the invention;

FIG. 3 is a diagram illustrating an exemplary data bitstream format which may be generated by a sensing device the invention;

DETAILED DESCRIPTION

Figure 1A:
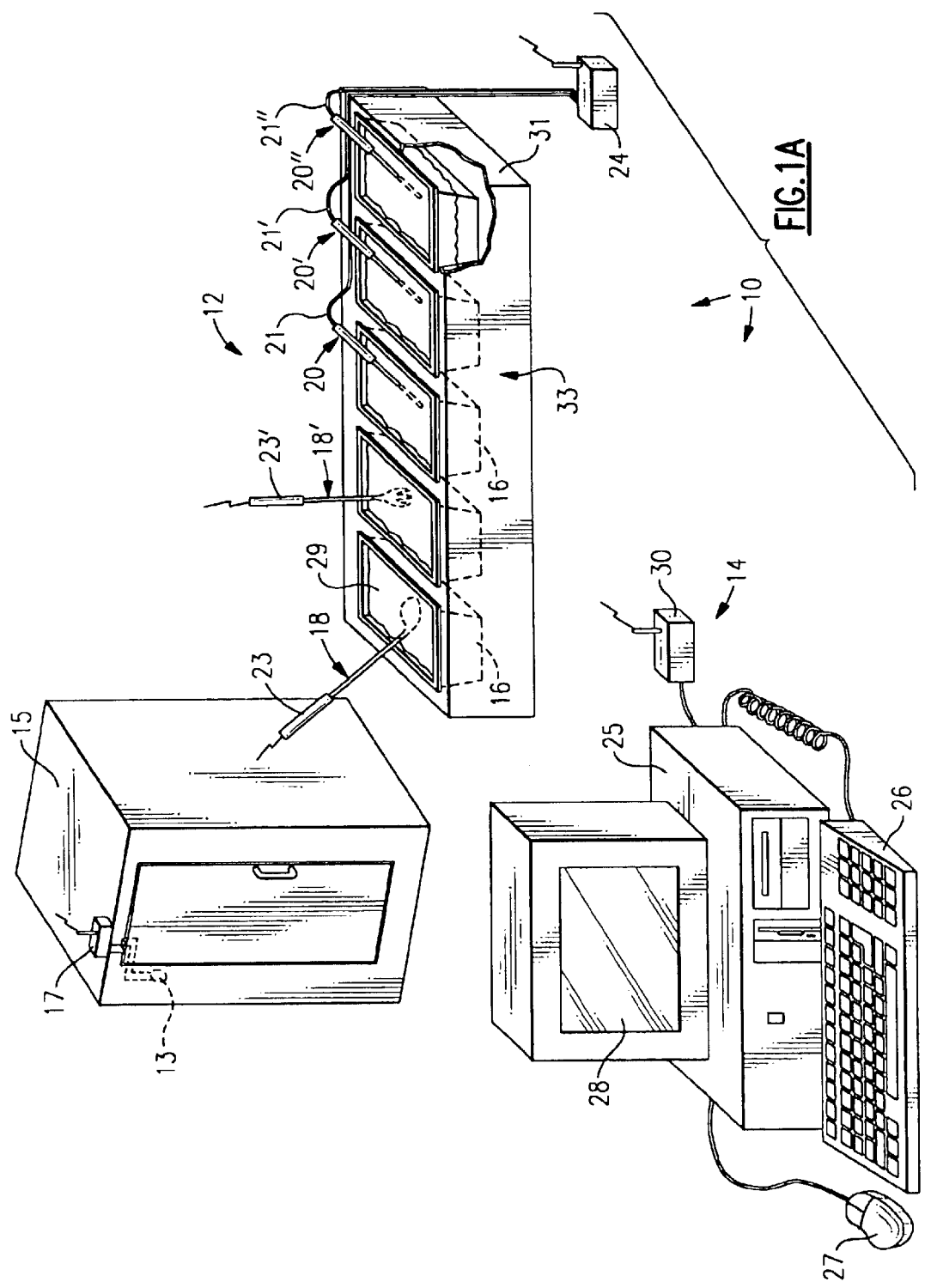
FIG. 1A is a physical schematic diagram of an exemplary embodiment of a system according to the invention.

A physical schematic diagram of the invention is shown in FIG. 1A. System 10 includes sensing subsystem 12 for sensing certain characteristics, most typically temperature characteristics of at least one food product and processing subsystem 14 for outputting and recording data received from the sensing subsystem.

Sensing subsystem 12 includes at least one sensing apparatus for sensing characteristics of food. In the embodiment of FIG. 1A sensing subsystem 12 includes two types of sensing devices for sensing characteristics of served food contained in temperature controlled serving containers 16, which are sometimes referred to as "warming trays". A first type of sensing device for sensing characteristics of served food is a cooking utensil 18 such as a spoon, fork, ladle, or spatula while a second type of sensing device for sensing characteristics of served food is a probe 20, 20', 20". Both cooking utensils 18 and probes 20 have at least one sensor, typically a temperature sensor, disposed thereon for sensing at least one characteristic of food. Utensils 18 and probes 20 are adapted to be disposed within a food product so that the sensor of the sensing device is in an operational sensing arrangement in relation to the food product. For example if the sensing device includes a thermal sensor, then the device is adapted so that the thermal sensor is in thermal contact with food when disposed in contact therein. Sensing system 12 includes at least one sensing device such as a utensil or a probe, but more typically will include a plurality of probes, utensils, or combinations of probes and utensils for sensing characteristics of food form several temperature controlled serving containers 16. Sensing subsystem 12 further includes a plurality of transmitters 22, 22', 24 for transmitting data generated from the served food sensing devices to the processing subsystem 14.

While the sensors incorporated in utensils 18 and probes 20 normally include temperature sensors, these devices may also be adapted to include, in addition to or alternatively, other types of sensors such as seismic sensors, pressure (psi) sensors, airflow and weight sensors. Furthermore it will be understood that in addition to having sensing devices for sensing characteristics of served food such as utensils and probes, sensing subsystem 12 may be adapted to include, additionally or alternatively, permanent position sensing devices, such as sensing device 13 for sensing temperature or other characteristics of stored food or other stored material or objects. In the embodiment of FIG. 1A, sensing device 13 is a thermocouple mounted in the interior of a refrigerator 15 which is in communication with a transmitter 17 for transmitting data corresponding to signals generated by thermocouple 13.

Processing subsystem 14, meanwhile, may comprise a personal computer 25 as shown in FIG. 1A having a keyboard 26, a mouse 27, a display 28, a processor 66, a memory 68 and a receiver 30 for receiving data from transmitters 17, 22, 22', 24 of the sensor subsystem 12. Processing subsystem 14 may too also be provided, for example, by a programmable touch screen in communication with a receiver.

A detailed physical schematic diagram of an exemplary probe 20''' of subsystem 12 is shown in FIG. 1B. Probe 20''' includes pin section 32 which is adapted for contact with a food product and a housing section 34 which houses a printed circuit board (PCB) 36 and a battery 37. For adapting probe 20''' to sense temperature, sensor or thermocouple 38 is deposited in pin section 32 and is completely enclosed by pin section 32. Thermocouple 38 may be provided by a type K thermocouple wire. Temperature indicating signals generated by thermocouple 38 are input to signal processing circuitry of PCB 36 which processes the sensor signal in a manner that will be described herein below.

While probes 20, 20', and 20" are shown as being hard-wired to a central transmitter 24, probe 20''' of FIG. 13 includes a dedicated transmitter, similar to transmitter 22, having an associated antenna 40. Circuitry for the dedicated transmitter of probe 20''' may be incorporated in PCB 36.

Probes of the type described, while they do not provide the function of being able to aid in the serving of food products, offer important advantages over sensing devices embodied in utensils, such as utensils 18 and 18'.

Probes are simpler in construction than utensil sensing devices, and therefore are more readily made in a configuration that enables them to be easily cleaned and sanitized. An important feature of the probe of the embodiment of FIG. 1B is that thermocouple 38 is disposed entirely within pin section 32, and does not come in direct contact with food products. Utensil sensing devices, by contrast, are not easily made with a thermocouple that is completely enclosed and yet is adapted to be good thermal contact with food in which the utensil is disposed. The National Sanitation Foundation (NSF), an independent not-for-profit organization tests utensils, devices, and tools, for use with food products, and approves them for use with food products only if they meet certain criteria for cleanability. Especially since the design provides for an enclosed thermocouple, probes of the general configuration described are expected to readily satisfy these criteria.

The fact that probes do not have to be repeatedly inserted into and removed from served food enables a plurality of probes to be hard-wired via conductors 21, 21', 21' to a single transmitter 24, without substantively affecting the functioning of the devices. By contrast, hard wiring of utensil sensing devices 18, 18' to a central transmitter is not generally viable given the requirement of mobility of such devices. Utilization of a single transmitter 24 to service several simply-constructed probes not intended to be regularly removed from food significantly reduces the overall costs of sensing subsystem 14. To the end that conductors 21, 21', 21" are minimally obtrusive to a food service agent serving food, conductors 21, 21', 21" may comprise flattened conductor housings and may be fixedly adhered to or otherwise secured to at least one surface in proximity with containers 16, such as surfaces 29, 31 of a member 33 that supports containers 16 as is shown in FIG. 1A.

Figure 2:
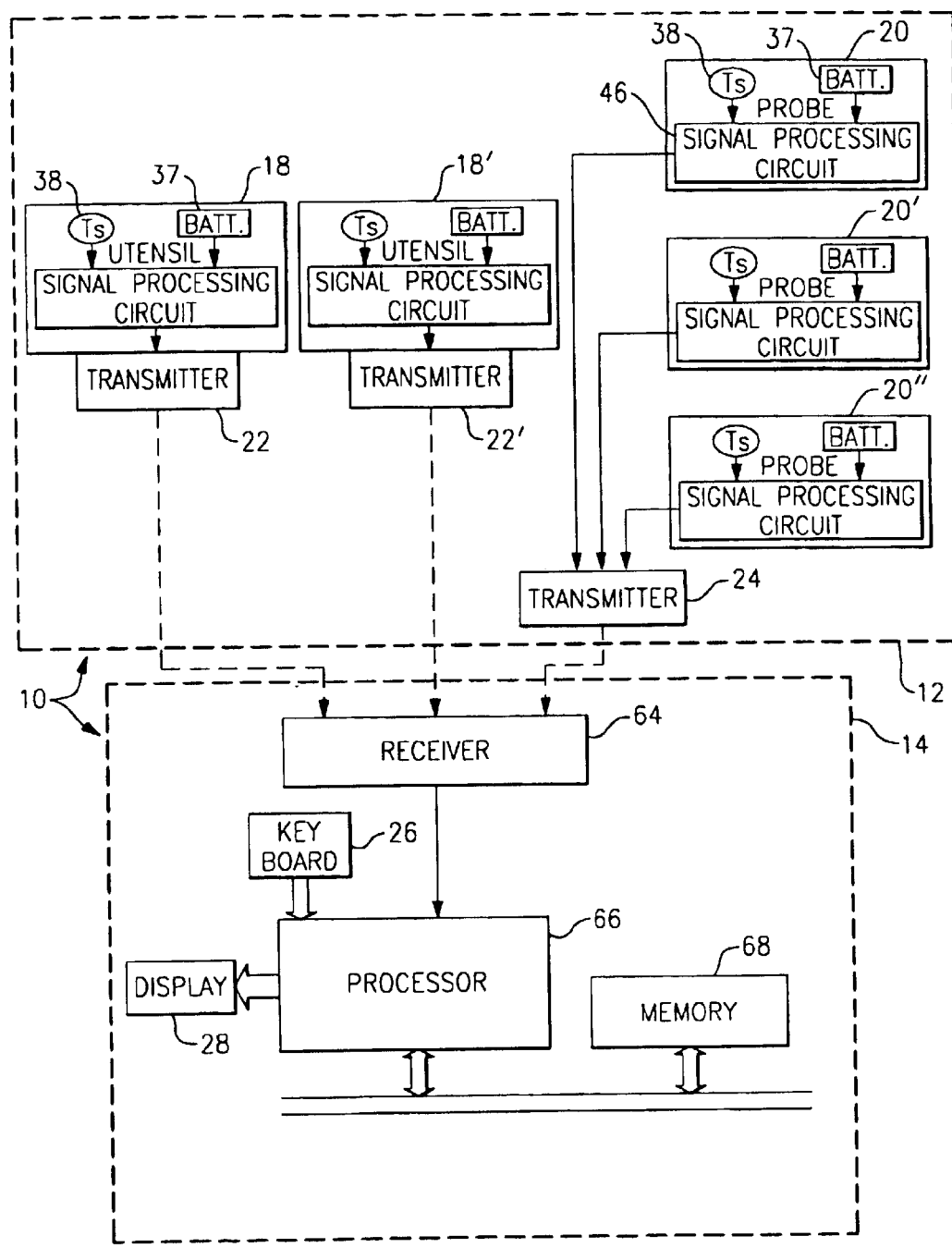
FIG. 2 is an exemplary block electrical diagram of an exemplary electrical system of the invention.

Additional operational aspects of system 10 are described with reference to FIG. 2 showing an exemplary block electrical diagram for sensing subsystem 12 and processing subsystem 14. As indicated above, a distinction between utensil sensing devices 18 and probe sensing devices 20 is that while a plurality of probes 20 can be serviced by a single transmitter 24, each utensil sensing device normally is serviced by a dedicated transmitter 22, 22', the circuitry of which is incorporated in utensil handle 23, 23'. Aside from this distinction, utensils and probes 20 have similar electrical configurations.

In a typical embodiment, each sensing device includes a signal processing circuit 46 powered by battery 37 for processing signals from at least one sensor of the device.

Normally, the at least one sensor of each device will include a temperature sensor 38. In addition to receiving signals from a temperature sensor 38, signal processing circuit 46 receives signals from battery 37 indicating a voltage level thereof.

In the exemplary embodiment, the signal processing circuit 46 of each device develops a multi-character digital bitstream 50 as represented in FIG. 3 encoding data generated by that device, for transmission to processing subsystem 14. Bitstream 50 may include a first set of bits 52 encoding a preamble for the data transmission (a set of bits indicating the following bits encode valid data), a second set of bits 54 indicating the temperature reading from temperature sensor 38, a third set of bits 56 indicating the voltage level of battery 37. In addition to including sets of bits that include sensor data and battery level data, bitstream 50 may also include sets of bits identifying the particular sensing device generating the data. Accordingly, each signal processing circuit 46 should include circuit elements generating identification stamps indicating the device originating the data. Circuit 46 may include circuit elements which generate at least two identification stamps, in the form of bit sets of bitstream 50, for each device. To the end a data bitstream encodes an identifier of the device generating the bitstream, a fourth set of bits 58 of bitstream 50 may encode the device type (i.e. spoon, fork, ladle, spatula, probe) of the device, while a fifth set of bits 60 of bitstream 50 may encode a specific device identifier. A sixth set of bits 62 of bitstream generated by circuit 46 should include a postamble indicating an end of valid data transmission. Since circuit elements for conversion of analog data from sensor 38 and battery 37 and generating a bitstream of data therefrom, and for generating identification bit sets are well known, they will not be described further herein.

Signal processing circuit 46 sends data via a conductor to a transmitter 22 which in the case of utensil sensor device is typically a transmitter dedicated for that utensil, and in the case of probe sensor a central transmitter 24 that services a plurality of probes.

Bitstream data which is transmitted by transmitters is received by the processing subsystem 14, which in addition to including a receiver 64 for receiving the transmitted data, may include the elements of a microprocessor 66 which communicates with receiver 64 via an I/O port (not shown), an associated memory 68 (typically including such memory devices as a program memory device, a RAM and a long term storage unit such as a hard drive), a display device 28, and input devices such as a keyboard 26 and mouse 27. When processing subsystem 14 includes a standard microprocessor, receiver 64 is adapted to convert received bitstream data into a format enabling the data to be processed by microprocessor 66, such as an RS 232 format.

Transmitters 17, 22, 22', 24, of the sensor subsystem 12 and receiver 64 of the processing subsystem 14 are preferably provided by RF transmitter and receiver units. However, it will be understood that the transmitters and receiver could be replaced by other wireless communication devices, such as a group of infrared transmitters and an infrared receiver or other types of hard-wired communication structures such as a multiplexed cable arrangement, a LAN, or an ethernet.

Data generated by batteries 37 and by the various sensor elements WT 38 of sensor subsystem 12 normally does not have to be sampled at an extremely high sample rate. Although data from the various sensing elements could be sampled at virtually any sample rate from an ultrafast submicrosecond sampling rate to a slower sample rate of once per several minutes, it is normally sufficient to configure system 10 to sample data at a rate that ranges from about once per several seconds to once per several minutes.

Typically, system 10 is configured to sample data from each device 18, 20 at a sampling rate of about one sample per minute. Because the data generated by the various devices 18, 20 does not have to be sampled at an extremely high data rate, and the occurrences of collisions between samples are correspondingly rare, it is normally not necessary to establish a high degree of coordination between the receiver 64 and the transmitters 17, 22, 22', 24 of subsystem 12. Accordingly, operable communication between transmitters 22, 22', 24 and receiver 64 can normally be established by configuring transmitters 22, 22' to send bitstream samples generated by their associated sensor device at a rate of about once per minute, and configuring transmitter 24 so that transmitter 24 transmits samples received at each of its input ports at a rate of about one sample per minute. A sample period should be long enough so that at least one complete bitstream 50 as described with reference to FIG. 3 is assured of being included in each sample. Preferably, a sample period is configured so that each sample contains a plurality of data bitstreams.

Figure 4:
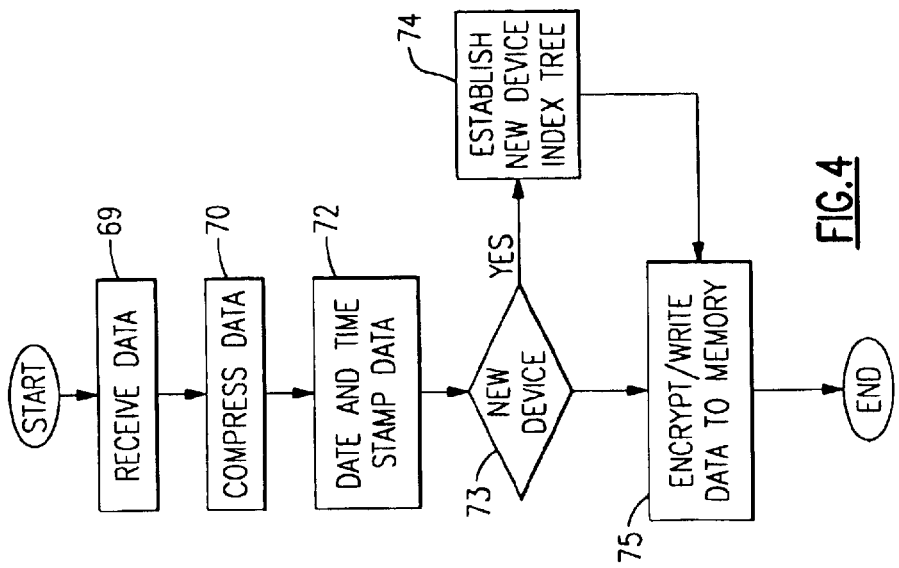
FIG. 4 is a flow diagram illustrating an exemplary operation of a data processing method of the invention.

Referring now to the flow diagram of FIG. 4, an exemplary method by which processor 66, operating under control of a main program stored in memory 68, may process data samples received by processing subsystem 14 will be explained in detail.

Figure 5:
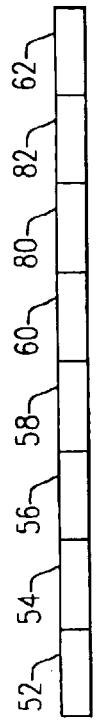
FIG. 5 illustrates an exemplary structure for a time and date stamped representative bitstream of the invention.

In an exemplary embodiment described in connection with the flow diagram of FIG. 4, processor 66 receives a sample at block 68, which as explained previously typically includes several bitstreams of the general configuration of data bitstream 50 and at block 70 executes a simple compression algorithm to compress the sample bitstream data to a form a single representative bitstream. This simple compression algorithm may comprise, for example, selection of one bitstream out of the several bitstreams, or averaging of data encoded in all or several of the bitstreams of a sample. After constructing a representative bitstream, processor 66 at block 72, stamps the bitstream with date and time stamps (with year/month/day/time information). When date and time stamping is complete, representative bitstream 78 as shown in FIG. 5 will include sets of bits, e.g. 80, 82, corresponding to the date and time stamps in addition to those bit sets 52, 54, 56, 58, 60, 62 encoding the parameters of the original bitstream 50.

To facilitate fast and efficient retrieval of data stored in memory 68, memory 68 may include files comprising preconfigured indexed hierarchical data storage structures for arranging data pertaining to specific sensing device in a systematic manner. A typical file structure for arranging data in memory 68 so that data may be quickly and efficiently retrieved is described with reference to FIG. 6. In a preferred embodiment, memory 68 includes a file 84 for each sensing subsystem such as subsystem 12 that processing subsystem 14 is configured to monitor. Each file 84, meanwhile, preferably includes a device index tree 85 for each device such as devices 18, 20 included in subsystem 12. Device trees 85, may include indexes 86, 88, 90, 92 pertaining to a device identifier, a date stamp year, a date stamp month, and a date stamp day, respectively. When processor 66 writes data into memory 68, it writes data to a file and offset location that depends on the identifier bit sets identifying the device originating the data, and the year, month, and day of the date stamp.

Before writing time and date stamped representative bitstream 78 to memory 68, processor at block 73 determines whether the present bitstream data pertains to a new sensing device just added to system. If the data does pertain to a new device, processor 66 at block 74 establishes a new device index tree 85 dedicated for storing present and future data pertaining to that particular device.

After determining the appropriate file and offset location for the bitstream data, processor at block 75 writes the bitstream data to the determined appropriate file and offset location. While writing data to memory 68, processor 66 preferably encrypts the bitstream data so that value or values of the sensor data cannot be determined by inspection, and cannot be determined without knowledge of the specific encryption scheme used and/or without access to a decryption scheme complementary with the employed encryption scheme. Since the employed encryption scheme cannot be determined without access to a high level program language readout of the main program, encryption of data as its is written into memory 68 provides for security of data recordings. The encryption of data written into memory 68 with a secret encryption scheme known only to the software provider prevents an unscrupulous computer records keeper from altering or tampering with stored data in a meaningful and organized way, thereby improving the reliability of computer-stored data. The encryption scheme used may be any commercially available encryption scheme. Encryption schemes which may be used with the present invention are described, for example, in Bruce Schneier, *Applied Cryptography*, Second Edition, John Wiley & Sons, 1996.

Before encrypting data and writing encrypted bitstream data to preconfigured indexed data storage structures of memory 66, processor 68 may drop those sets of bits from bitstream 78 pertaining to the date stamp information (year, month, day) in the interest of conserving memory space. However, the security of the encryption may be improved by maintaining the date stamp bits through the encryption process.

In addition to encrypting data while writing data to memory 68, processing subsystem 14 may be adapted to carry out additional processing functions designed to improve the integrity and security of the data transmission. For example, receiver 30 may be configured to encode sets of bitstreams received from transmitters 17, 22, 22', 24 with application of an available encoding scheme (known only to the software designer) before sending encoded data to processor 66. Processor, in turn, in such an embodiment of the invention, would be adapted to decode the encoded sets of bitstreams according to a decoding scheme corresponding to the encoding scheme. Severable applicable encoding and decoding schemes are also described in Schneier's *Applied Cryptography*, referenced above.

In addition to processing received data according to the above described protocol, processing subsystem 14 is also programmed to output and display stored data in a variety of ways so as to facilitate useful and informative data analysis. Preferably, the display and data output function of subsystem 14 is programmed with use of a modern high level programming language having sophisticated graphical output capabilities. A preferred programming language for use in programming data output functions of subsystem 14 is Visual C++ 6.0 of the type available from Microsoft corporation of Seattle, Wash. Examples of other languages highly suitable for use in programming data processing functions of subsystem 14 are Visual Basic, also available from Microsoft and JAVA available from Sun Microsystems of Santa Clara, Calif.

Figure 7:
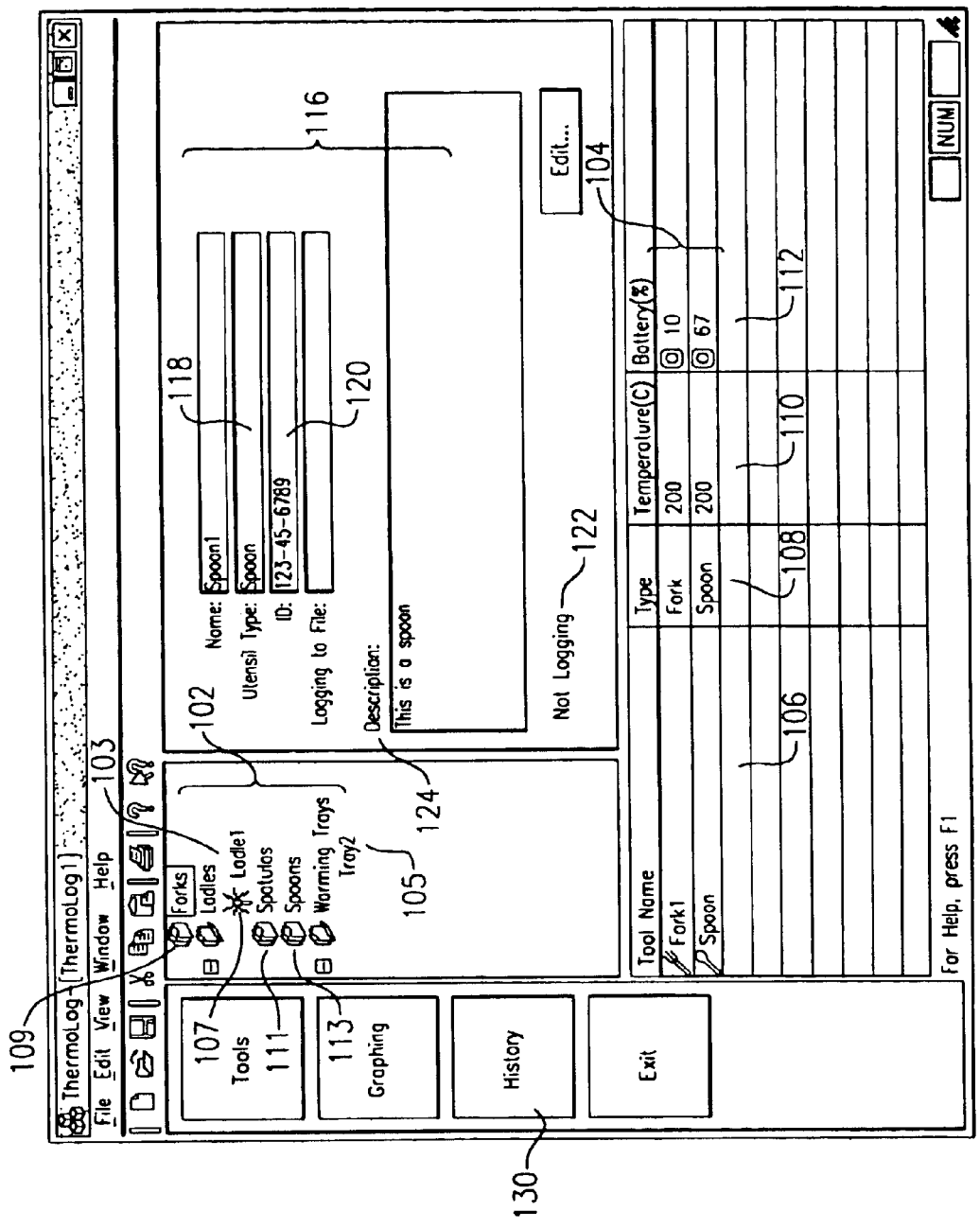
FIG. 7 illustrates a first exemplary display output according to the invention.
Figure 8:
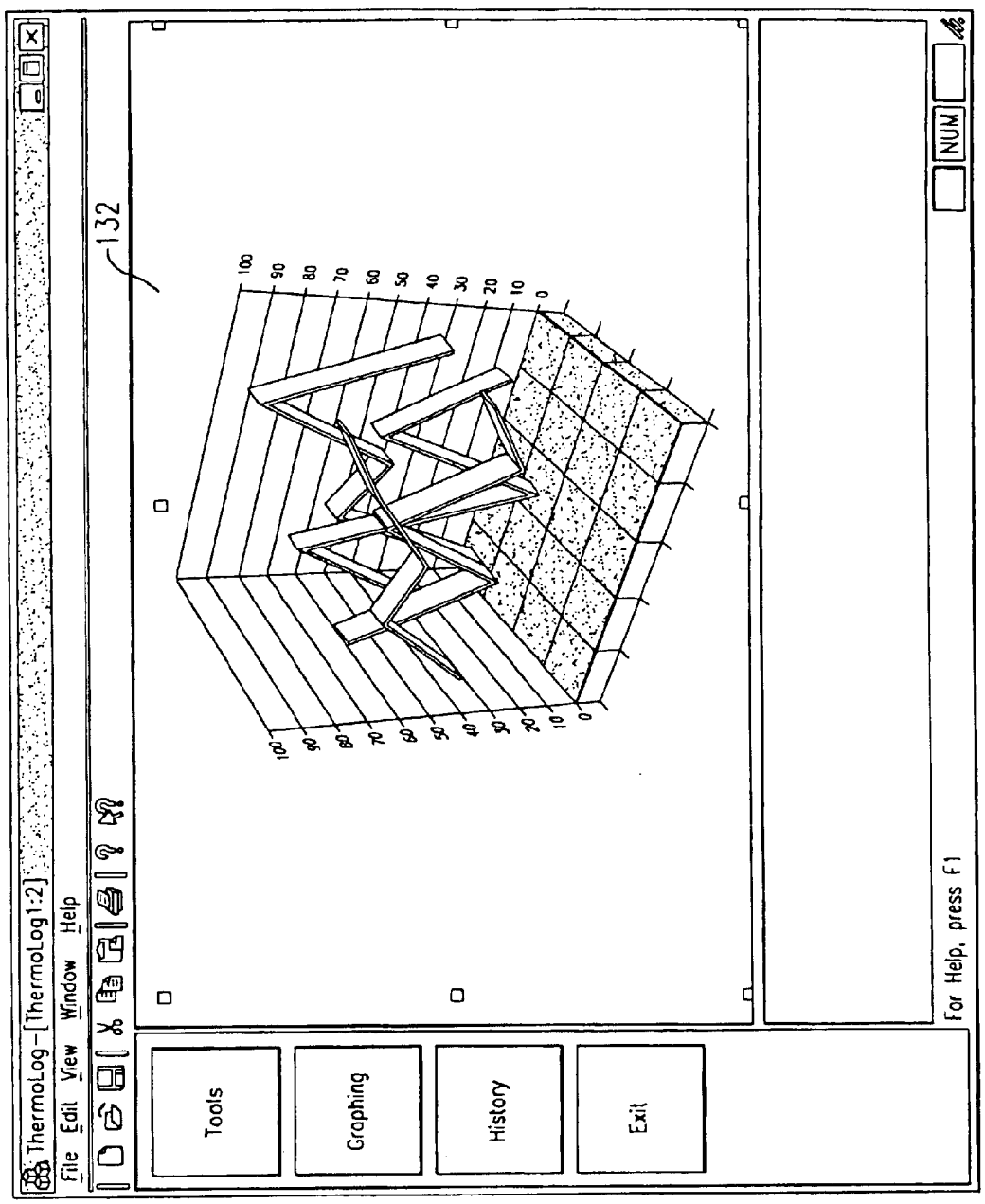
FIG. 8 illustrates a second exemplary display output according to the invention.

In a first display feature that is described with reference to the graphical output display of FIG. 7, processor 66 is adapted to display at system overview display section 102 all sensing devices e.g. device 18 which have been connected to system 10 and to highlight, with some form of indicia, those devices currently logging data. The indicia indicating a device currently logging data may be, for example, a blinking icon, or a different colored icon, or supplementary icon. To facilitate this display feature, processor 66 may be made to periodically poll the contents of memory 68 to determine the identifier associated with each index tree and to analyze the last data entry entered for each device index tree 85 which has been configured in memory 68. If the time stamp of the last data entry is within a predetermined time of the present time, then the device is determined to be currently logging data. In the specific example of display section 102 a probe such as probe 20 of subsystem 12 is designated as a tray of a set of "warming trays". The system corresponding to display section 102 includes at least two sensing devices, a utensil indicated by "Ladle1" 103, and a probe as indicated by "Tray2" 105. "Ladle1" is currently logging data as is indicated by logging icon 107, while the probe of "Tray2" is not logging data as is indicated by the absence of icon 107. A determination as to whether the system corresponding to display section 102 includes any forks, spatulas, or spoons can be made by clicking on folder icons 109, 111, 113 pertaining to forks, spatulas or spoons. Subsystem 14 may be programmed so that clicking on these icons causes graphical display of all respective forks, spatulas or spoons of the system 10.

In another display feature, processor 66 is adapted to display the device identifier, device type and the current output of the sensors associated with a particular device. Display section 104 shows a device identifier 106 device type 108, a temperature sensor reading 110, and a battery level reading 112 for two devices connected to an exemplary system. In outputting data on a display screen 28, processor 66 reads bitstream data that has been previously recorded in memory 68, which as previously explained was encrypted when written to, and thus in a form which does not allow the data values to be determined without application of a decryption scheme associated with the scheme for encryption. Accordingly, whenever processor 66 reads data from memory 68 for display, it applies an appropriate decryption scheme to decipher the data before displaying the data on screen 28. Current device sensor values may be obtained by polling the contents of the last data entry for each device that has been determined to be currently connected to system.

A feature which may be implemented in connection with the feature of displaying current sensor outputs is an alarm feature. For example, if the temperature for a sensing device is not within an acceptable range or if battery power falls below an acceptable limit, then display 28 may be made to generate an indicia indicating an alarm condition. Such indicia may be graphical or audible.

In still another display feature, processor 66 is adapted to display the status of any device which is currently connected to or at one time was connected to system 10 as is illustrated by display section 116. Processor 66 may be configured so that any particular icon of system overview display section 102 may be clicked on via mouse 27 to display detailed information about the device corresponding to that particular icon. In addition to displaying such data as a device type 118, identification code 120, and the logging/not logging status 122 of a device, status section 116 may also display a detailed device description 124 including a text message providing detailed information about the device. A detailed device description may be displayed by accessing a previously established lookup table correlating a device identifier with device description associated with the device.

Figure 6:
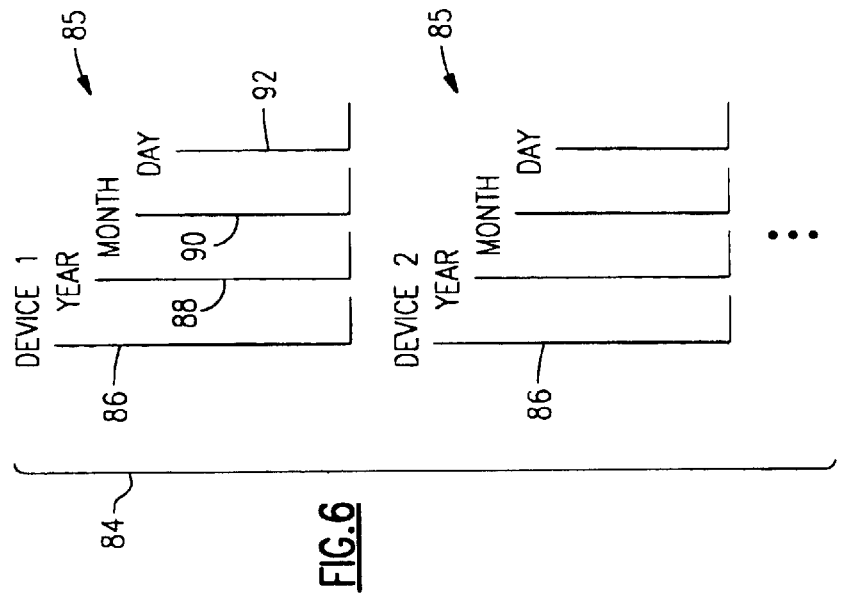
FIG. 6 illustrates a possible indexed hierarchical file structure allowing for quick retrieval of data stored by the system's processing subsystem.

In yet another display feature, processor 66 is adapted to display sensor data over time for any device or collection of devices of system 10, at any time frame in the history of the operation of system 10. If the icon 130 labeled "history" is clicked on, a user may be prompted to enter data pertaining to a time period of interest. In accordance with the entered time period, processor 66 may read contents from memory 68 for all devices logging data in that time period, or of select devices only, decrypt the data by application of an appropriate decryption scheme, and cause display of the results on screen 28. The output of such data may be in tabular form or in graphical form as illustrated by graphical display 132 of FIG. 6 illustrating an output from a plurality of logging sensors in a selected time period of interest.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. A monitoring system monitoring food present in at least one serving or storage container, said monitoring system comprising:

a sensing subsystem including at least one sensing device generating at least one data stream, said at least one sensing device adapted to be disposed in said at least one serving or storage container having food; and a processing subsystem receiving and processing said at least one data stream, wherein said processing subsystem includes a memory having an indexed hierarchical data storage structure including at least one device index tree indexed by a device identifier and by date stamp data, and wherein said processing subsystem is adapted to encrypt said data stream and write said encrypted data stream to said indexed hierarchical data storage structure indexed by said device identifier and by said date stamp data.

2. The monitoring system of claim 1, wherein said at least one sensing device comprises a temperature sensor.

3. The monitoring system of claim 1, wherein said at least one sensing device comprises a seismic sensor.

4. The monitoring system of claim 1, wherein said at least one sensing device comprises a pressure sensor.

5. The monitoring system of claim 1, wherein said at least one sensing device comprises an airflow sensor.

6. The monitoring system of claim 1, wherein said at least one sensing device comprises a weight sensor.

7. The monitoring system of claim 1, wherein said sensing subsystem includes a plurality of portable sensing devices, wherein said plurality of portable sensing devices are disposed so that each of a plurality of serving or storage containers has disposed therein at least one of said plurality of portable sensing devices.

8. The monitoring system of claim 1, wherein said sensing subsystem includes a plurality of portable sensing devices and a central transmitter, wherein said central transmitter is in communication with each of said plurality of portable sensing devices, and wherein said central transmitter is further in communication with said processing subsystem.

9. The monitoring system of claim 1, wherein said at least one serving or storage container is a structure including a refrigerated food storage space.

10. The monitoring system of claim 1, wherein said processing subsystem is in wireless communication with said at least one sensing device.

11. The monitoring system of claim 1, wherein said at least one sensing device continuously generates data stream data, and wherein said processing subsystem continuously receives data of said data stream data.

12. A monitoring system monitoring food present in at least one serving or storage container, said monitoring system comprising:

a sensing subsystem including at least one sensing device generating at least one data stream, said at least one sensing device adapted to be disposed in said at least one serving or storage container having food; and a processing subsystem receiving and processing said at least one data stream, wherein said sensing subsystem is adapted so that sensing devices can be added to or deleted from said sensing subsystem, wherein said processing subsystem includes a display, and wherein said processing subsystem is adapted to output on said display graphical indicia indicating each of said sensing devices connected to said system.

13. The monitoring system of claim 12, wherein said at least one data stream includes an identifier.

14. The monitoring system of claim 12, wherein said sensing subsystem includes a plurality of portable sensing devices, wherein said plurality of portable sensing devices are disposed so that each of a plurality of serving or storage containers has disposed therein at least one of said plurality of portable sensing devices.

15. The monitoring system of claim 12, wherein said at least one sensing device is adapted to be in contact with food.

16. The monitoring system of claim 12, wherein said sensing subsystem includes a plurality of portable sensing devices and a central transmitter, wherein said central transmitter is in communication with each of said plurality of portable sensing devices, and wherein said central transmitter is further in communication with said processing subsystem.

17. The monitoring system of claim 12, wherein said at least one sensing device is a portable sensing device comprising a temperature sensor.

18. The monitoring system of claim 12, wherein said at least one sensing device comprises an airflow sensor.

19. The monitoring system of claim 12, wherein said at least one sensing device comprises first and second sensing devices, each generating a data stream so that said at least one data stream includes at least one data stream from each of said first and second sensing devices, wherein said processing subsystem is configured to at least one of time or date stamp at least one data stream from said first sensing device and at least one data stream from said second sensing device.

20. The monitoring system of claim 12, wherein said at least one sensing device comprises a weight sensor.

21. The monitoring system of claim 12, wherein said at least one sensing device is a portable device in a form of a fork, knife, or spoon.

22. The monitoring system, of claim 12, wherein said system is configured so that said sensing device is a portable sensing device adapted to wirelessly transmit said at least one data stream to said processing subsystem.

23. The monitoring system of claim 12, wherein said at least one sensing device comprises first and second portable sensing devices, each generating a data stream so that said at least one data stream includes at least one data stream from each of said first and second portable sensing devices, wherein said processing subsystem is configured to compress at least one data stream from said first sensing device and at least one data stream from said second sensing device.

24. The monitoring system of claim 12, wherein said at least one sensing device comprises first and second sensing devices, each generating a data stream so that said at least one data stream includes at least one data stream from each of said first and second sensing devices, wherein said processing subsystem is configured to determine whether a data stream received therein corresponds to a sensing device which is newly added to said system.

25. The monitoring system of claim 12, wherein said at least one serving or storage container is a structure including a refrigerated food storage space.

26. The monitoring system of claim 12, wherein said processing subsystem is in wireless communication with said at least one sensing device.

27. The monitoring system of claim 12, wherein said at least one sensing device continuously generates data stream data, and wherein said processing subsystem continuously receives data of said data stream data.

28. A monitoring system monitoring food present in at least one serving or storage container, said monitoring system comprising:
a sensing subsystem including at least one sensing device generating at least one data stream, said at least one sensing device adapted to be disposed in said at least one serving or storage container having food; and
a processing subsystem receiving and processing said at least one data stream,
wherein said sensing subsystem is adapted so that sensing devices can be added to or deleted from said sensing subsystem, wherein said at least one sensing device comprises a plurality of sensing devices currently logging data, wherein said processing subsystem includes a display and a memory, and wherein said processing subsystem is adapted to output on said display graphical indicia indicating each of said sensing devices which is currently logging data.

29. The monitoring system of claim 28, wherein said at least one sensing device comprises first and second sensing devices, each generating a data stream so that said at least one data stream includes at least one data stream from each of said first and second sensing devices, wherein said first and second sensing devices are configured so that at least one data stream from said first sensing device and at least one data stream from said second device include data corresponding to an identifier.

30. The monitoring system of claim 28, wherein said sensing subsystem includes a plurality of sensing devices, wherein said plurality of sensing devices are disposed so that each of a plurality of serving or storage containers has disposed therein at least one of said plurality of sensing devices.

31. The monitoring system of claim 28, wherein said sensing subsystem includes a plurality of portable sensing devices and a central transmitter, wherein said central transmitter is in communication with each of said plurality of portable sensing devices, and wherein said central transmitter is farther in communication with said processing subsystem.

32. The monitoring system of claim 28, wherein said at least one sensing device comprises a cooking utensil incorporating a temperature sensor.

33. The monitoring system of claim 28, wherein said at least one sensing device comprises first and second sensing devices, each generating a data stream so that said at least one data stream includes at least one data stream from each of said first and second sensing devices, wherein said processing subsystem is configured to determine whether a data stream received therein corresponds to a sensing device which is newly added to said system.

34. The monitoring system of claim 28, wherein said at least one sensing device comprises first and second sensing devices, each generating a data stream so that said at least one data stream includes at least one data stream from each of said first and second sensing devices, wherein said processing subsystem is configured to time or date stamp at least one data stream from said first sensing device and at least one data stream from said second sensing device.

35. The monitoring system of claim 28, wherein said at least one sensing device comprises a pressure sensor.

36. The monitoring system, of claim 28, wherein said system is configured so that said at least one sensing device is a portable sensing device adapted to wirelessly transmit said at least one data stream.

37. The monitoring system of claim 28, wherein said at least one sensing device comprises first and second portable sensing devices, each generating a data stream so that said at least one data stream includes at least one data stream from each of said first and second portable sensing devices, wherein said processing subsystem is configured to compress at least one data stream from said first sensing device and at least one data stream from said second sensing device.

38. The monitoring system of claim 28, wherein said at least one sensing device is a portable device including a temperature sensor.

39. The monitoring system of claim 28, wherein said at least one serving or storage container is a structure including a refrigerated food storage space.

40. The monitoring system of claim 28, wherein said processing subsystem is in wireless communication with said at least one sensing device.

41. The monitoring system of claim 28, wherein said at least one sensing device continuously generates data stream data, and wherein said processing subsystem continuously receives data of said data stream data.

42. A monitoring system monitoring food present in at least one serving or storage container, said monitoring system comprising:
a sensing subsystem including at least one sensing device generating at least one data stream, said at least one sensing device adapted to be disposed in said at least one serving or storage container having food; and
a processing subsystem receiving and processing said at least one data stream,
wherein said processing subsystem includes a display and a memory, wherein said processing subsystem is adapted to execute a polling routine wherein said processing subsystem analyzes the content of data in said memory to determine the identity of each sensing device included in said system, and to determine which of said sensing devices are currently logging data, wherein said processing subsystem is adapted to output on said display graphical indicia responsive to said polling routine indicating each of said sensing devices which has been connected to said system, and to further output on said display a logging icon for each device which is currently logging data.

43. The monitoring system of claim 42, wherein said at least one sensing device is a cooking utensil incorporating a sensor.

44. The monitoring system claim 42, wherein said at least one sensing device is provided by a probe having an elongated hollow pin section, said elongated hollow pin section incorporating a sensor.

45. The monitoring system of claim 42, wherein said at least one sensing device is a portable device including a temperature sensor.

46. The monitoring system of claim 42, wherein said at least one serving or storage container is a structure including a refrigerated food storage space.

47. The monitoring system of claim 42, wherein said processing subsystem is in wireless communication with said at least one sensing device.

48. The monitoring system of claim 42, wherein said at least one sensing device continuously generates data stream data, and wherein said processing subsystem continuously receives data of said data stream data.

49. The monitoring system of claim 42, wherein said logging icon indicates a sensing device type.

50. A monitoring system monitoring food present in at least one serving or storage container, said monitoring system comprising:
a sensing subsystem including at least one sensing device generating at least one data stream, said at least one sensing device adapted to be disposed in said at least one serving or storage container having food; and a processing subsystem nonintegral with said at least one sensing device receiving and processing said at least one data stream, wherein said at least one data stream includes an identifier and sensor data, and wherein said sensing device is a cooking utensil incorporating a sensor.

51. The monitoring system of claim 50, wherein said identifier identifies a sensing device.

52. The monitoring system of claim 50, wherein said identifier identifies a sensing device type.

53. The monitoring system of claim 50, wherein said sensor-incorporating utensil is a fork.

54. The monitoring system of claim 50, wherein said sensor-incorporating utensil is a spoon.

55. The monitoring system of claim 50, wherein said sensor-incorporating utensil is a knife.

56. The monitoring system of claim 50, wherein said sensor-incorporating utensil is a ladle.

57. The monitoring system of claim 50, wherein said at least one sensing device is a portable device including a battery and wherein said at least one data stream includes a battery power level indicator.

58. The monitoring system of claim 50, wherein said processing subsystem includes a display, and wherein said processing subsystem is adapted to display on said display said sensor data generated by said at least one sensing device.

59. The monitoring system of claim 50, wherein said at least one serving or storage container is a structure including a refrigerated food storage space.

60. The monitoring system of claim 50, wherein said processing subsystem is in wireless communication with said at least one sensing device.

61. The monitoring system of claim 50, wherein said at least one sensing device continuously generates data stream data, and wherein said processing subsystem continuously receives data of said data stream data.

62. The monitoring system of claim 50, wherein said processing system nonintegral with said at least one sensing device is in communication with said at least one sensing device via a hard-wired communication structure.

63. A monitoring system monitoring food present in at least one serving or storage container, said monitoring system comprising:

a sensing subsystem including at least one sensing device generating at least one data stream, said at least one sensing device adapted to be disposed in said at least one serving or storage container having food; and a processing subsystem in wireless communication with said at least one sensing device wirelessly receiving and processing said at least one data stream, wherein said at least one data stream includes an identifier and sensor data, and wherein said at least one sensing device is adapted to be inserted into food.

64. The monitoring system of claim 63, wherein said at least one sensing device is a cooking utensil incorporating a sensor.

65. The monitoring system of claim 63, wherein said at least one sensing device is provided by a probe having an elongated hollow pin section, said elongated hollow pin section incorporating a sensor.

66. The monitoring system of claim 63, wherein said sensing subsystem includes a plurality of sensing devices, wherein said plurality of sensing devices are disposed so that each of a plurality of serving or storage containers has disposed therein at least one of said plurality of sensing devices.

67. The monitoring system of claim 63, wherein said at least one sensing device is a portable device including a battery, wherein said at least one data stream includes battery power level data, wherein said processing subsystem includes a display, and wherein said processing subsystem displays on said display battery power level data indicating a battery power level of said at least one sensing device.

68. The monitoring system of claim 63, wherein said processing subsystem includes a display, and wherein said processing subsystem is adapted to display on said display said data generated by said at least one sensing device.

69. The monitoring system of claim 63, wherein said at least one serving or storage container is a structure including a refrigerated food storage space.

70. The monitoring system of claim 64, wherein said at least one sensing device continuously generates data stream data, and wherein said processing subsystem continuously receives data of said data stream data.

71. A monitoring system monitoring food stored in at least one serving or storage container, said monitoring system comprising:

a sensing subsystem including at least one sensing device continuously generating data stream data, said at least one sensing device adapted to be disposed in said at least one serving or storage container having food; and a processing subsystem nonintegral with said at least one sensing device continuously receiving and processing data of said data stream data, wherein said data stream data includes an identifier and sensor data, and wherein said sensing device is provided by a probe having an elongated hollow pin section, said elongated hollow pin section incorporating a sensor.

72. The monitoring system of claim 71, wherein said sensing subsystem includes a plurality of sensing devices, wherein said plurality of sensing devices are disposed so that each of a plurality of serving or storage containers has disposed therein at least one of said plurality of sensing devices.

73. The system of claim 71, wherein said identifier identifies a sensing device.

74. The system of claim 71, wherein said identifier identifies a sensing device type.

75. The system of claim 71, wherein said identifier identifies a container.

76. The monitoring system of claim 71, wherein said at least one sensing device is a portable device including a battery and wherein said data stream data includes a battery power level indicator.

77. The monitoring system of claim 71, wherein said at least one serving or storage container is a structure including a refrigerated food storage space.

78. The monitoring system of claim 71, wherein said sensing subsystem includes first and second sensing devices, and wherein said processing subsystem is in wireless communication with each of said first and second sensing devices.

79. The monitoring system of claim 71, wherein said processing subsystem samples data stream data from said first sensing device while said first sensing device is disposed in said first serving or storage container.

80. A monitoring system monitoring food present in at least one serving or storage container, said monitoring system comprising:

a sensing subsystem including at least one sensing device generating at least one data stream, said at least one sensing device adapted to be disposed in said at least one serving or storage container having food; and a processing subsystem nonintegral with said at least one sensing device receiving and processing said at least one data stream, wherein said at least one data stream includes an identifier, and wherein said at least one sensing device incorporates a seismic sensor.

81. The monitoring system of claim 80, where said sensing subsystem includes a first portable sensor device incorporating a seismic sensor and generating a first data stream, and a second portable sensor device also incorporating a seismic sensor and generating a second data stream, and wherein said processing subsystem receives and processes said first and second data streams.

82. The monitoring system of claim 80, wherein said at least one sensing device is adapted to be inserted into food.

83. The system of claim 80, wherein said sensor device is a cooking utensil incorporating a sensor.

84. The monitoring system of claim 80, wherein said at least one sensing device is a portable device including a battery and wherein said at least one data stream includes a battery power level indicator.

85. The monitoring system of claim 80, wherein said at least one serving or storage container is a structure including a refrigerated food storage space.

86. The monitoring system of claim 80, wherein said processing subsystem is in wireless communication with said at least one sensing device.

87. The monitoring system of claim 80, wherein said at least one sensing device continuously generates data stream data, and wherein said processing subsystem continuously receives data of said data stream data.

88. A monitoring system monitoring food present in at least one serving or storage container, said monitoring system comprising:
a sensing subsystem including at least one sensing device generating at least one data stream, said at least one sensing device adapted to be disposed in said at least one serving or storage container having food; and
a processing subsystem nonintegral with said at least one sensing device receiving and processing said at least one data stream,
wherein said at least one data stream includes an identifier, and wherein said at least one sensing device includes a pressure sensor.

89. The monitoring system of claim 88, wherein said sensing subsystem includes a first portable sensor device incorporating a pressure sensor and generating a first data stream, and a second portable sensor device also incorporating a pressure sensor and generating a second data stream, and wherein said processing subsystem receives and processes said first and second data streams.

90. The system of claim 88, wherein said at least one data stream includes an identifier identifying said sensing device.

91. The system of claim 88, wherein said at least one sensing device is a cooking utensil incorporating a sensor.

92. The monitoring system of claim 88, wherein said at least one sensing device is a portable device including a battery, and wherein said at least one data stream includes battery power level data.

93. The monitoring system of claim 88, wherein said processing subsystem includes a display, and wherein said processing subsystem is adapted to display on said display data generated by said at least one sensing device.

94. The monitoring system of claim 88, wherein said at least one serving or storage container is a structure including a refrigerated food storage space.

95. The monitoring system of claim 88, wherein said processing subsystem is in wireless communication with said at least one sensing device.

96. The monitoring system of claim 88, wherein said at least one sensing device continuously generates data stream data, and wherein said processing subsystem continuously receives data of said data stream data.

97. A monitoring system monitoring food stored in first and second serving or storage containers, said monitoring system comprising:
a sensing subsystem including first sensing device venerating a first at least one data stream and second sensing device generating second at least one data stream, said first sensing device adapted to be disposed in said first at least one serving or storage container storing food said second sensing, device adapted to be disposed in said second at least one serving or storage container; and
a processing subsystem receiving and processing said first at least one data stream and second at least one data stream,
wherein said first at least one data stream and said second at least one data stream include sensor data and identifier data, and wherein said processing subsystem is configured to compress at least one of said first at least one data stream and said second at least one data stream.

98. The monitoring system of claim 97, wherein said processing subsystem wirelessly receives said first at least one data stream and said second at least one data stream.

99. The monitoring system of claim 97, wherein said first and second sensing devices are adapted to contact food.

100. The monitoring system of claim 97, wherein said first and second sensing devices include temperature sensors.

101. The monitoring system of claim 97, wherein said monitoring system is adapted to at least one of time stamp or date stamp said first at least one data stream and said second at least one data stream.

102. The monitoring system of claim 97, wherein said processing subsystem includes a display and wherein said processing subsystem is adapted to display a graph plotting said sensor data over time.

103. The monitoring system of claim 97, wherein at least one of said first and second serving or storage containers is a structure including a refrigerated food storage space.

104. The monitoring system of claim 97, wherein said processing subsystem is in wireless communication with each of said first and second sensing devices.

105. The monitoring system of claim 97, wherein said first sensing device continuously generates first data stream data, wherein said second sensing device continuously generates second data stream data, and wherein said processing subsystem continuously receives data of said first data stream data and said second data stream data.

106. A monitoring system monitoring food present in at least one serving or storage container, said monitoring system comprising:
a sensing subsystem including at least one sensing device generating at least one data stream, said at least one sensing device adapted to be disposed in said at least one serving or storage container having food; and
a processing subsystem nonintegral with said at least one sensing device receiving and processing said at least one data stream,
wherein said at least one data stream includes an identifier, and wherein said at least one sensing device includes a weight sensor.

107. The monitoring system of claim 106, where said sensing subsystem includes a first portable sensor device incorporating a weight sensor and generating a first at least one data stream, and a second portable sensor device also incorporating a weight sensor and generating a second at least one data stream, and wherein said processing subsystem receives and processes said first and second data streams.

108. The monitoring system of claim 106, wherein said at least one sensing device is a portable device including a battery.

109. The monitoring system of claim 106, wherein said at least one sensing device is a portable device including a dedicated transmitter for wirelessly transmitting sensor data from said sensor device.

110. The monitoring system of claim 106, wherein said at least one sensing device is adapted to be inserted into food.

111. The monitoring system of claim 106, wherein said processing subsystem includes a display, and wherein said processing subsystem is adapted to display on said display data generated by said at least one sensing device.

112. The monitoring system of claim 106, wherein said at least one serving or storage container is a structure including a refrigerated food storage space.

113. The monitoring system of claim 106, wherein said processing subsystem is in wireless communication with said at least one sensing device.

114. The monitoring system of claim 106, wherein said at least one sensing device continuously generates data stream data, and wherein said processing subsystem continuously receives data of said data stream data.

115. A monitoring system monitoring food present in at least first and second serving or storage containers, said monitoring system comprising:

a sensing subsystem including first sensing device generating a first at least one data stream and second sensing device generating second at least one data stream, said first sensing device adapted to be disposed in said first serving or storage container, said second sensing device adapted to be disposed in said second serving or storage container; and a processing subsystem receiving and processing said first at least one data stream and said second at least one data stream, wherein each of said first and second sensing devices includes a battery, and wherein said first at least one data stream and said second at least one data stream each include a battery power level indicator.

116. The monitoring system of claim 115, wherein at least one of said sensing devices includes a temperature sensor, and wherein at least one of said first or second at least one data streams includes temperature data.

117. The monitoring system of claim 115, wherein at least said first sensing device is adapted to contact food.

118. The monitoring system of claim 115, wherein at least one of said sensing devices is a cooking utensil incorporating a sensor.

119. The monitoring system of claim 115, wherein at least one of said sensing devices is probe having an elongated pin section, said elongated pin section incorporating a sensor.

120. The monitoring system of claim 115, wherein said each of said first and second sensing devices are adapted to contact food.

121. The monitoring system of claim 115, wherein said processing subsystem includes a display, wherein said first at least one data stream and said second at least one data stream include sensor data, and wherein said processing subsystem is adapted to display an alarm indicia on said display if said sensor data of one of said data streams satisfies a predetermined criteria.

122. The monitoring system of claim 115, wherein said processing subsystem includes a display, wherein at least one of data streams includes sensor data, and wherein said processing subsystem displays on said display a graph in which said sensor data of at least one of said first at least one data stream and said second at least one data stream is plotted over time.

123. The monitoring system of claim 115, wherein said processing subsystem includes a display, wherein said first at least one data stream and said second at least one data stream include sensor data, and wherein said processing subsystem displays on said display, for a specific time period specified by a user, a first graph in which sensor data is plotted over time for said first sensing device, and a second graph in which sensor data is plotted over time for said second sensing device, said first and second graphs being displayed simultaneously.

124. The monitoring system of claim 115, wherein said processing subsystem includes a display, and wherein said processing subsystem is adapted to display on said display data battery power level data indicating a battery power level of at least one of said first and second sensing devices.

125. The monitoring system of claim 115, wherein each of said first and second sensing devices is a portable device adapted to be removably inserted into food.

126. The monitoring system of claim 115, wherein said processing subsystem is adapted to time stamp said first at least one data stream and said second at least one data stream.

127. The monitoring system of claim 115, wherein at least one of said first and second serving or storage containers is a structure including a refrigerated food storage space.

128. The monitoring system of claim 115, wherein said processing subsystem is in wireless communication with each of said first and second sensing devices.

129. The monitoring system of claim 115, wherein said first sensing device continuously generates first data stream data, wherein said second sensing device continuously generates second data stream data, and wherein said processing subsystem continuously receives data of said first data stream data and said second data stream data.

\* \* \* \* \*